June 16, 1964  G. VON MOOSE ST. JOHN  3,137,039
MOLDS FOR MAKING AIR FILTERS AND THE LIKE
Filed Aug. 25, 1958  2 Sheets-Sheet 1
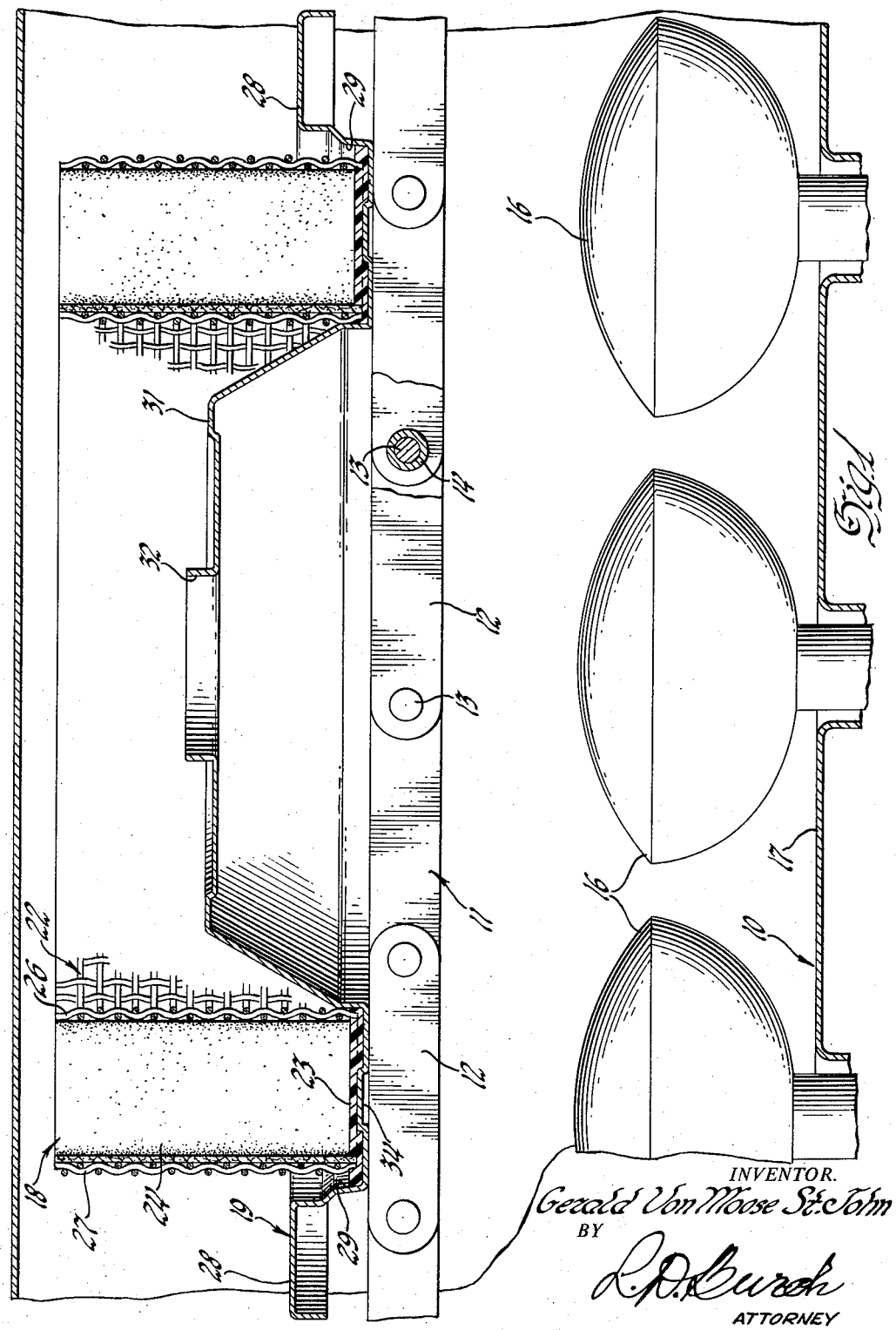
INVENTOR.
Gerald Von Moose St. John
BY
L.D. Burch
ATTORNEY

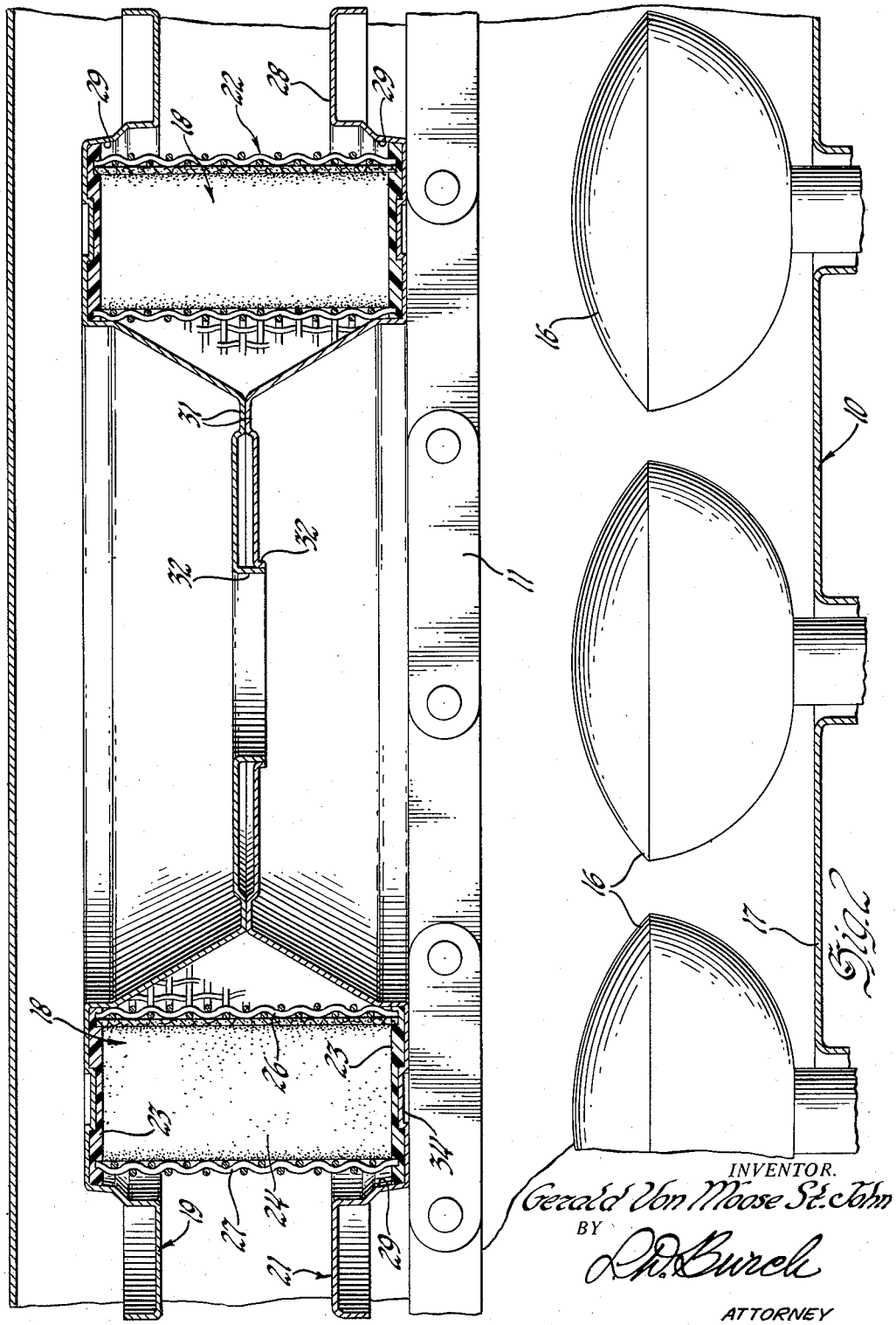

United States Patent Office 3,137,039
Patented June 16, 1964

3,137,039
MOLDS FOR MAKING AIR FILTERS
AND THE LIKE
Gerald Von Moose St. John, Lapeer, Mich., assignor to General Motors Corporation, Detroit, Mich., a corporation of Delaware
Filed Aug. 25, 1958, Ser. No. 756,957
2 Claims. (Cl. 18—34)

This invention relates to apparatus for manufacturing air cleaners and the like for use in internal combustion engines or other devices utilizing large quantities of air.

It is proposed to provide inexpensive and lightweight molds in a molding process to be utilized in the manufacture of filter elements for air cleaners and the like.

In the drawings:

FIGURE 1 is a fragmentary cross sectional view of a curing oven embracing the apparatus and utilizing the method embodying the invention;

FIGURE 2 is a view similar to FIGURE 1 but illustrating the method and apparatus under different operative conditions.

The curing oven 10 comprises a conveyor 11 consisting of links 12, rods 13 and spacers 14, the links 12 being separated by the spacers 14 and secured together upon the rods 13 to provide a perforated structure through which heat may be radiated from the infra red lamps 16 supported in the casing 17 beneath the conveyor 11. The conveyor 11 is adapted to support filter elements 18 and molds 19 and 21 employed in the manufacture of the filter elements 18. The filter elements 18 may comprise annular filter units 22, the opposite ends of which are adapted to be secured in end plates 23 consisting of any thermally setting substance such as polyvinyl chloride plastic or other resilient sealing means. The filter units 22 consist of accordion pleated or other paper filter means 24 disposed between inner and outer screens 26 and 27, respectively. The filter means 24 is adapted to filter out foreign substances, the screens 26 and 27 acting as supports and flame arrestor means for the filter element 18.

The molds 19 and 21 are formed to provide outer annular flanges 28 within which are annular recesses or mold cavities 29. Inwardly of the cavities 29 are annular ledges 31 and guide means 32. The ledges 31 are off set laterally inwardly of the recess 29 approximately to the extent of half the length of the filter elements 18 so that the molds 19 and 21 may be supported by the ledges 31 with one of the filter elements 18 having the ends thereof disposed in the recess 29. The guide means consists of axially aligned and concentric flanges adapted to be projected one within the other to align the molds 19 and 21 so that the recesses 29 are in spaced and oppositely disposed and extending relation.

The filter elements are manufactured by placing one of the molds 19 on the conveyor 11 with one end of a filter unit 22 immersed in the thermally setting plastic means and extending within the recess 29 of the mold 19. The mold 19 may be provided in the recess 29 with an annular ring 34 against which the end of the filter unit 22 may project to space the filter unit in the thermally setting means 23. Thereafter the thermally setting means 23 is cured by moving the conveyor across a plurality of the heating elements 16. Then, and without removing the filter unit 22, the mold 19 may be inverted and disposed on the mold 21 with the opposite end of the filter unit 22 projecting into the recess 29 in the mold 21. The mold 21 is also provided with an annular support 34 for engagement by the filter unit 22 to prevent the filter unit from projecting entirely through the thermally setting means 23. When the mold 19 is inverted and disposed on the mold 21 with the filter unit 22 therebetween the guide means 32 is aligned to make certain that the recesses 29 are in directly opposed relation. Also when the guide means are disposed one within the other the mold 19 will be supported on the mold 21 on the ledges 31 with which the two molds are provided. Thereafter when the assembly is placed on the conveyor 11 and exposed to the heating elements 16, the thermally setting means 23 at the opposite ends of the filter element 18 will be cured.

When the curing is completed the molds 19 and 21 may be separated from the thermally setting means 23 to provide the filter element indicated at 18.

I claim:

1. An apparatus for making filter elements for air cleaners and the like and comprising a pair of molds each having spaced and oppositely disposed and externally extending recesses formed therein for supporting and curing the spaced and aligned ends of a filter element immersed in thermally setting sealing means, said pair of molds having oppositely disposed supporting ledge and guide means associated therewith and positioned inwardly of said recesses for mutual engagement for aligning and positioning said molds and supporting one of said molds upon the other and spacing said recesses in oppositely disposed and extending relation.

2. An apparatus for making filter elements for air cleaners and the like as defined by claim 1 and in which said molds are annular and said recesses and said ledges and said guides are annular and formed in concentric relation in said molds with said guides being disposed radially within said ledges and said ledges radially within said recesses.

References Cited in the file of this patent
UNITED STATES PATENTS

| | | |
|---|---|---|
| 1,377,133 | Jacobson | May 3, 1921 |
| 1,659,399 | Faber | Feb. 14, 1928 |
| 2,539,917 | McKinley | Jan. 30, 1951 |
| 2,655,710 | Roensch et al. | Oct. 20, 1953 |
| 2,732,031 | Rabbitt | Jan. 24, 1956 |
| 2,771,156 | Kasten et al. | Nov. 20, 1956 |
| 2,892,339 | Flower et al. | June 30, 1959 |
| 2,895,174 | Hockett | July 21, 1959 |
| 2,934,791 | Kasten | May 3, 1960 |

FOREIGN PATENTS

| | | |
|---|---|---|
| 680,211 | Great Britain | Oct. 1, 1952 |